US011662966B1

(12) United States Patent
Matsuo

(10) Patent No.: US 11,662,966 B1
(45) Date of Patent: May 30, 2023

(54) PRODUCTION PRINTING SYSTEMS, SERVERS, AND VARIABLE PRINTING METHODS FOR EFFICIENT AND FLEXIBLE PROCESSING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/562,367

(22) Filed: Dec. 27, 2021

(51) Int. Cl.
    *G06F 3/12* (2006.01)
(52) U.S. Cl.
    CPC .......... *G06F 3/1243* (2013.01); *G06F 3/1204* (2013.01); *G06F 3/1268* (2013.01)
(58) Field of Classification Search
    None
    See application file for complete search history.

(56) References Cited

U.S. PATENT DOCUMENTS

| 2002/0042798 | A1* | 4/2002 | Takei | G06F 3/1259 715/274 |
| 2012/0092695 | A1* | 4/2012 | Masuyama | G06F 3/1285 358/1.14 |
| 2022/0050644 | A1* | 2/2022 | Kikuchi | G06F 3/1272 |

FOREIGN PATENT DOCUMENTS

JP          2012-086416 A    5/2012

* cited by examiner

*Primary Examiner* — Frantz Bataille
(74) *Attorney, Agent, or Firm* — Hawaii Patent Services; Nathaniel K. Fedde; Kenton N. Fedde

(57) ABSTRACT

Provided is a production printing system that enables more efficient and flexible processing. The production printing system X processes variable data for production printing. A variable document creation unit creates a variable document with a condition set for each record. A subset integration unit collects records of same type in any one or any combination of prepress, printing, post-processing, and output destination as a subset according to the condition set for each record of the variable document created by the variable document creation unit. A job ticket creation unit creates a job ticket corresponding to the subset collected by the subset integration unit. A variable processing unit performs processing of the job by the job ticket created by the job ticket creation unit.

18 Claims, 8 Drawing Sheets

PRODUCTION PRINTING SYSTEMS, SERVERS, AND VARIABLE PRINTING METHODS FOR EFFICIENT AND FLEXIBLE PROCESSING

BACKGROUND

The present disclosure relates specifically to a production printing system, a server, and a variable printing method.

In industrial printing, which is called production printing by using commercial (industrial) printing equipment, the components of the final product are manufactured by dividing the work into multiple processes. For example, in the case of bookbinding, a cover, a body (color), a body (black and white), a promotional material, a band, a shipping envelope, and the like, are processed as different jobs. Then, in the middle of the process, each job is collected and finished as a final product, a book.

On the other hand, there is a variable printing technology that prints differently for each record in the database by using a common form, or the like.

As a typical variable printing technology, an image forming apparatus that enables control of a print job in record units and subset units and improves the processing efficiency of the entire print job has been described. In this technology, a variable print job in which pages set with the same finishing are grouped together as a subset among a plurality of pages to be printed in each record is printed in record units, and a print error is detected. It is determined whether the print error was detected on the first page of the record or on the first page of the subset of records. If it is determined that the print error has been detected on the first page of the record, the print process for the record is suspended. Then, if it is determined that the print error is detected on the first page of the subset, the print process for the subset is suspended. If it is detected that the print error has been cleared, the reserved print process is restarted.

SUMMARY

A production printing system of the present disclosure is a production printing system that processes variable data for production printing, including: a variable document creation unit that creates a variable document with a condition set for each record; a subset integration unit that collects records as a subset according to the condition set for each the record of the variable document created by the variable document creation unit; a job ticket creation unit that creates a job ticket corresponding to the subset collected by the subset integration unit; and a variable processing unit that performs processing by the job ticket created by the job ticket creation unit.

A server of the present disclosure is a server for production printing systems that process variable data for production printing, including: a variable document creation unit that creates a variable document with a condition set for each record; a subset integration unit that collects records as a subset according to the condition set for each the record of the variable document created by the variable document creation unit; a job ticket creation unit that creates a job ticket corresponding to the subset collected by the subset integration unit; and a variable processing unit that performs processing by the job ticket created by the job ticket creation unit.

A variable printing method of the present disclosure is a variable printing method executed by a server of a production printing system that processes variable data for production printing, including the steps of: creating a variable document with a condition set for each record; collecting records as a subset according to the condition set for each the record of the variable document that is created; creating a job ticket corresponding to the subset that is collected; and performing processing by the job ticket that is created.

DETAILED DESCRIPTION

Embodiment

[Configuration of Production Printing System X]

Figure 1:
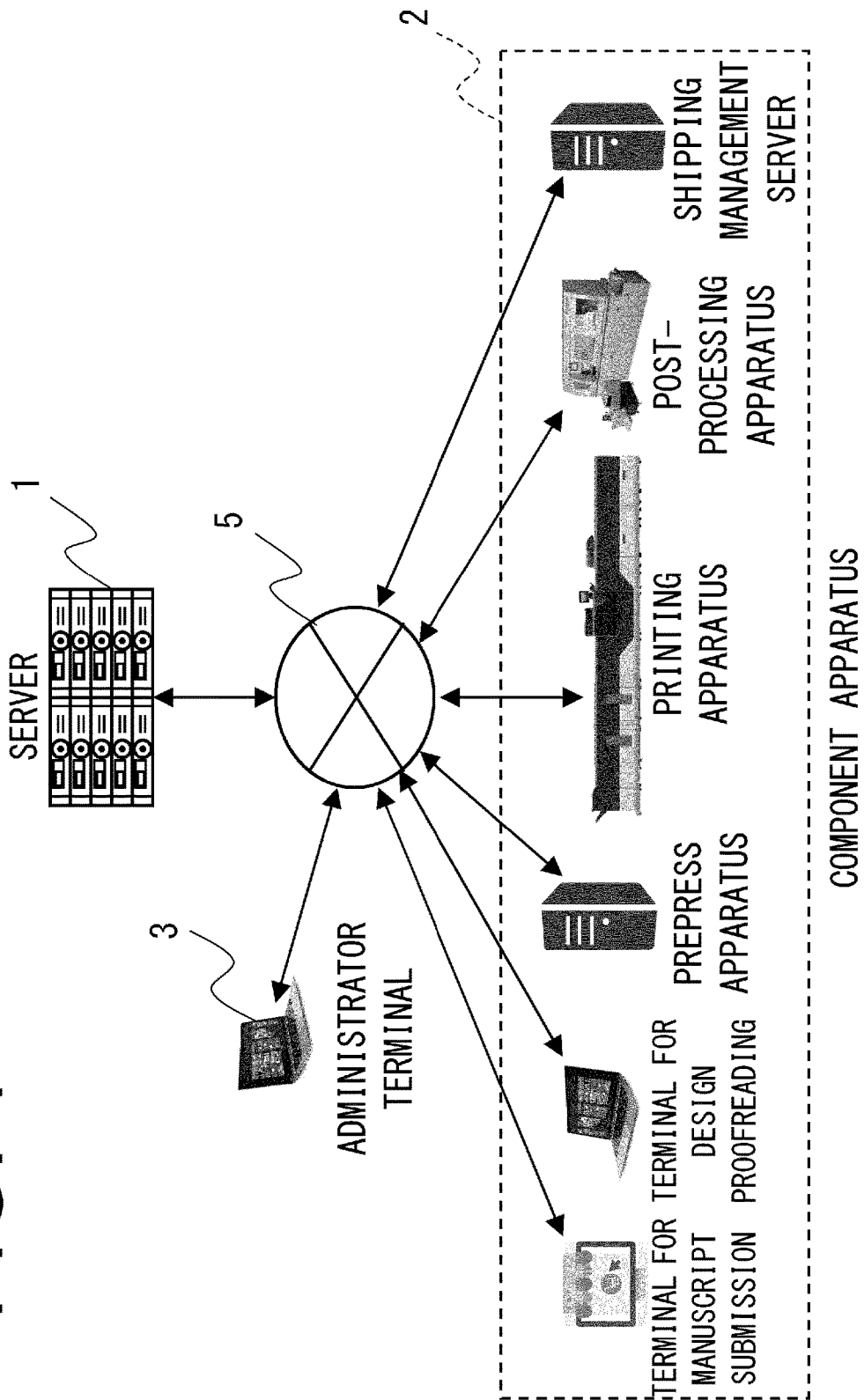
FIG. 1 is a system configuration diagram of a production printing system according to an embodiment of the present disclosure.

Firstly, with reference to FIG. 1, the overall system configuration of the production printing system X according to the present embodiment is described.

The production printing system X according to the present embodiment is a system for performing design and printing in industrial printing (production printing).

Here, in the production printing system X according to the present embodiment, final product such as an output book is called as an "order", and each component of the order is set as a job. In the production printing system X according to the present embodiment, each job for outputting the order is assigned to the component apparatus 2 and managed by a workflow.

The production printing system X according to the present embodiment includes a server 1, a component apparatus 2, and an administrator terminal 3, and each apparatus is connected with a network 5.

The server 1 is a server for designing variable printing in production printing and managing a workflow. The server 1 is a PC (Personal Computer) server, a dedicated apparatus, a general-purpose apparatus, or the like, installed on a so-called cloud or at a user's place. On this basis, the server 1 designs a variable document by using dedicated design application software (hereinafter, simply referred to as "application"). Further, the server 1 manages a workflow of production printing by executing a printing process management application.

Specifically, the server 1 sends and receives various instructions and information to and from the component apparatus 2 of each process, and requests management and processing for the status of each component apparatus 2. At this time, the server 1 sets the dependency relationship between a plurality of the jobs configuring the order by using each template as described later. Then, the server 1 may perform the processing of each configured job according to the dependency. At this time, the server 1 may also be possible to execute processing for unplanned processing such as changes, cancellations, or the like, which is occurred in the order. In addition, the server 1 may be a server that executes a common platform that manages user management, tenant management, security management, notification service for maintenance, prepress management, storage management of each document, management of printing apparatuses, and the like. The above-mentioned application may be executed on this server.

The component apparatus 2 is a component that executes various jobs of production printing, and it is each apparatus managed by the server 1. The component apparatus 2 includes, for example, a terminal for submission, a terminal for design proofreading, a prepress apparatus, a printing apparatus for production printing, a post-processing apparatus, a shipping management server, and the like. In this embodiment, one of these apparatuses is simply referred to as a component apparatus 2. Among the component apparatuses 2, each terminal or server can be connected to the server 1 via a web browser such as a PC or smartphone, a dedicated application, or the like.

The administrator terminal 3 is a terminal of the administrator of the printing process. The administrator terminal 3 allows the administrator to access the server 1 to design a variable document by GUI, check the progress status, and request processing.

Figure 2:
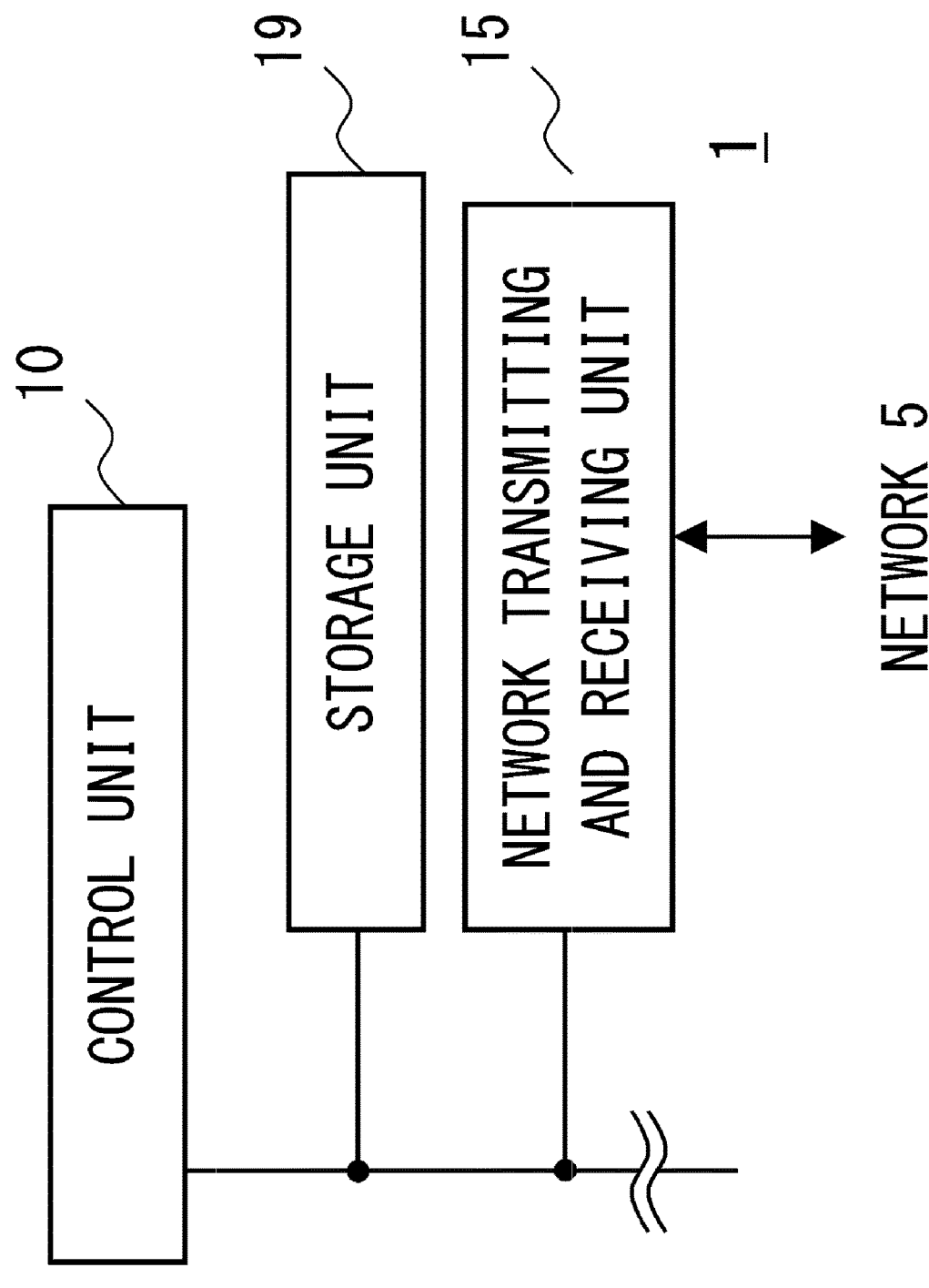
FIG. 2 is a block diagram showing a control configuration of the server as shown in FIG. 1.

Then, with reference to FIG. 2, the control configuration of the server 1 is described.

The server 1 includes a control unit 10, a network transmitting and receiving unit 15, a storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Collected Circuit, a processor for a specific application), or the like.

The control unit 10 reads a control program stored in a ROM or HDD of the storage unit 19, expands the control program in the RAM, and executes the control program, so that the control unit 10 can be operated as each part of the functional block as described later. Further, the control unit 10 controls the entire apparatus according to the instruction information input from the administrator terminal 3 or a console.

The network transmitting and receiving unit 15 is a network connection unit including a LAN board, a wireless transmitter/receiver, and the like, for connecting to the network 5. The network 5 of the present embodiment is, for example, a LAN (Local Area Network), Wi-Fi, WAN (Wide Area Network), a mobile phone network, a voice telephone network, or the like.

The network transmitting and receiving unit 15 transmits/receives data on a data communication line, and transmits/receives a voice signal on a voice telephone line.

The storage unit 19 is a non-temporary recording medium such as a semiconductor memory such as a ROM (Read Only Memory) or a RAM (Random Access Memory) or an HDD (Hard Disk Drive).

The control program for controlling the operation of the server 1 is stored in the ROM or HDD of the storage unit 19. The control program includes an OS (Operating System), middleware on the OS, services (daemons), various applications, database data, and the like. Among these, various applications include the above-mentioned printing process management application.

In addition to this, the storage unit 19 also stores the account settings of the user and the administrator of the production printing system X. Further, a storage area for each user may be set in the storage unit 19.

In addition, in the server 1, the control unit 10 may be integrally formed such as a GPU built-in CPU, a chip-on-module package, an SOC (System On a Chip), or the like.

Further, the control unit 10 may have a built-in RAM, ROM, flash memory, or the like.

[Functional Configuration of Server 1]

Figure 3:
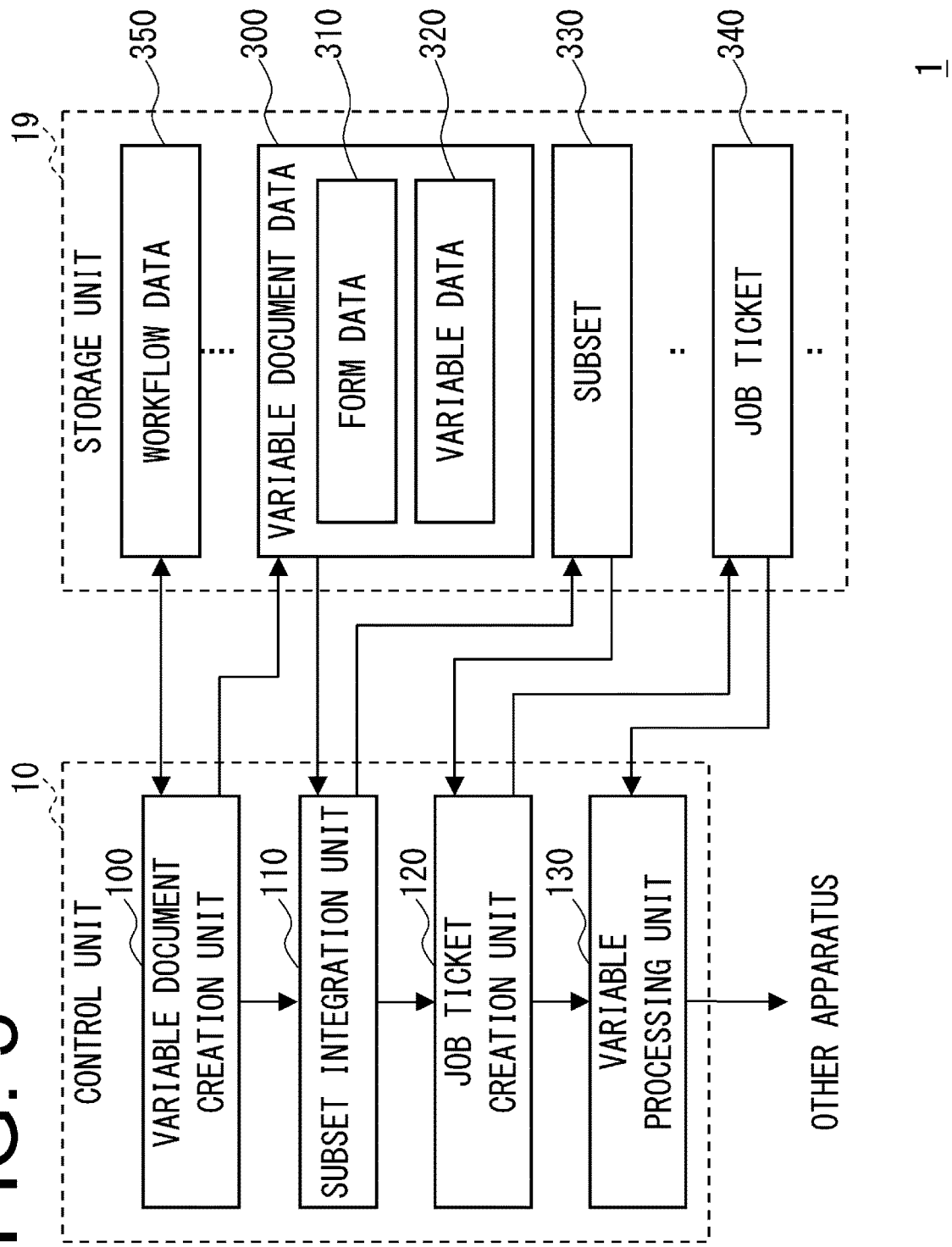
FIG. 3 is a block diagram showing a functional configuration of a production printing system according to an embodiment of the present disclosure.

Here, with reference to FIG. 3, the functional configuration of the server 1 of the production printing system X according to the present embodiment is described.

The control unit 10 of the server 1 includes a variable document creation unit 100, a subset integration unit 110, a job ticket creation unit 120, and a variable processing unit 130.

The storage unit 19 stores variable document data 300, subset 330, a job ticket 340, and workflow data 350.

The variable document creation unit 100 creates a variable document in which conditions are set for each record.

In the present embodiment, the variable document creation unit 100 provides a GUI (Graphical User Interface) by a design application. As a result, the variable document creation unit 100 designs the variable document data 300.

In the present embodiment, the variable document creation unit 100 can create a variable document by using the set template.

At this time, the variable document creation unit 100 can specify the condition to be set in the variable data 320 with the output attribute of the record as a condition.

The variable document creation unit 100 can also change the variable document according to the check by the subset integration unit 110 described below.

The subset integration unit 110 collects the records of the variable data 320 of the variable document data 300 as the subset 330 according to the conditions set for each the record of the variable document created by the variable document creation unit 100.

Specifically, the subset integration unit 110 collects the records of the variable data 320 into the subset 330 according to the condition specification set by the variable document creation unit 100. Therefore, the subset integration unit 110 may collect the records corresponding to the condition based on an item set for each record according to the template into the subset 330. In addition to this, the subset integration unit 110 can collect the records of the variable data 320 into the subset 330 by a more complicated condition specification set by the user and may be required nesting.

Further, the subset integration unit 110 may collect records of the same processing.

Specifically, the subset integration unit 110 can create a temporary job ticket for each record, and from this content, the records that perform the same processing can be set as the subset 330.

More specifically, the subset integration unit 110 can collect those having the same type of any one or any combination of prepress, printing, post-processing, and output destination into the subset 330.

Further, the subset integration unit 110 may collect records with specific attributes.

Specifically, when the specific attribute is set for the item of each record, the subset integration unit 110 can search for this and collect it.

Further, the subset integration unit 110 may check that the job ticket 340 corresponding to the subset 330 can be executed. The subset integration unit 110 may collect the records into the subset 330 according to the result of this check.

The job ticket creation unit 120 creates a job ticket 340 corresponding to the subset 330 collected by the subset integration unit 110.

The variable processing unit 130 processes with the job ticket 340 created by the job ticket creation unit 120.

In the present embodiment, the variable processing unit 130 causes the component apparatus 2 to execute each processing according to the job ticket 340. This process includes prepress, printing, post-processing, and other processing.

In the present embodiment, the variable processing unit 130 may set the output destination to any one or any combination of the print output, the e-mail output, and the electronic document output depending on the conditions.

The variable document data 300 is a file, a database, or the like, which collects variable documents used at the time of variable printing and various data related thereto.

The variable document data 300 may be described in, for example, JDF (Job Description Format) and/or JMF (Job Messaging Format).

In the present embodiment, the variable document data 300 includes form data 310 including a common form, and the like, used in variable printing, and variable data 320 where printing changes for each copy. These data may be included in the variable document data 300 as attribute data.

The form data 310 is data including a common form, or the like, for performing variable printing. The form data 310 basically does not change at the time of printing. The form data 310 may be, for example, data such as PDF (Portable Document Format), PDL (Page Description Language), and PPML (Personalized Print Markup Language) of XML (Extensible Markup Language) format. Among these, the PDF may be PDF/X, which is a subset of the standard PDF defined by the International Organization for Standardization (ISO15930), a simpler PDF, or the like.

Further, the form data 310 may include image data such as jpg, gif, BMP, PNG, TIFF, or the like, other document data, and other type data. In addition, the form data 310 may include layout information that defines the layout on the page, and the like. The layout information may include format information such as position (coordinates) on the page of the form, size, font size of variable data 320, left alignment, center alignment, right alignment, and the like. Further, the form data 310 may include data for explaining the definition and items of the variable data 320.

The variable data 320 is data for variable output for changing the print content at the time of printing. The variable data 320 may be embedded in the variable document data 300, for example, in a tabular format including a plurality of records, a database format such as XML, or the like.

Alternatively, the variable data 320 may be separately added as a file in a format that is easy to handle as a database. In this case, the variable data 320 may be a database such as a tab-separated or comma-separated file, a spreadsheet application file, another type of database file, a list file, or the like.

In the present embodiment, each record of the variable data 320 has various attributes set in a plurality of items, and it may include data related to condition specification.

The subset 330 is data collected the records of variable data 320 according to the condition set for each record of the variable document.

In this embodiment, the subset 330 is data that is described in JDF and/or JMF and includes form data 310 as similar to variable document data 300. In this case, when the subset 330 is generated, the records extracted from the form data 310 and the variable data 320 may be copied from the original variable document data 300.

The job ticket 340 is job data for causing the server 1 or each component apparatus 2 to execute a process corresponding to the condition item of each record included in the variable data 320 of the created variable document data 300. The job ticket 340 may be described in JDF (Job Description Format) and/or JMF (Job Messaging Format) as attribute data of processing, for example.

In the present embodiment, the job ticket 340 is designated for prepress, printing, post-processing, and an output destination according to condition, and commands, data, and the like, to be transmitted to the output destination are set.

In addition, the job ticket 340 may include data created by the prepress process, correction contents from the workflow, processing results by offset printing, and the like. Further, the job ticket 340 may also include information changed according to the prepress process or the post process.

The workflow data 350 is data for setting a workflow for creating an order, which is a final product, by combining job templates.

In the present embodiment, the workflow data 350 includes specified data (hereinafter, referred to as "template") for specifying condition for each record of the variable data 320 in order to perform variable printing by the variable document data 300. This template includes settings for what kind of job ticket 340 is generated according to the condition set for each record of the variable data 320.

Here, the control unit 10 of the server 1 is made to function as the variable document creation unit 100, the subset integration unit 110, the job ticket creation unit 120, and the variable processing unit 130 by executing the control program stored in the storage unit 19.

Further, each part of the server 1 described above becomes a hardware resource for executing the image forming method of the present disclosure.

In addition, a part or any combination of the above-mentioned functional configurations may be configured in terms of hardware or circuit by using IC, programmable logic, FPGA (Field-Programmable Gate Array), or the like.

[Variable Data Process by Production Printing System X]

Figure 6:
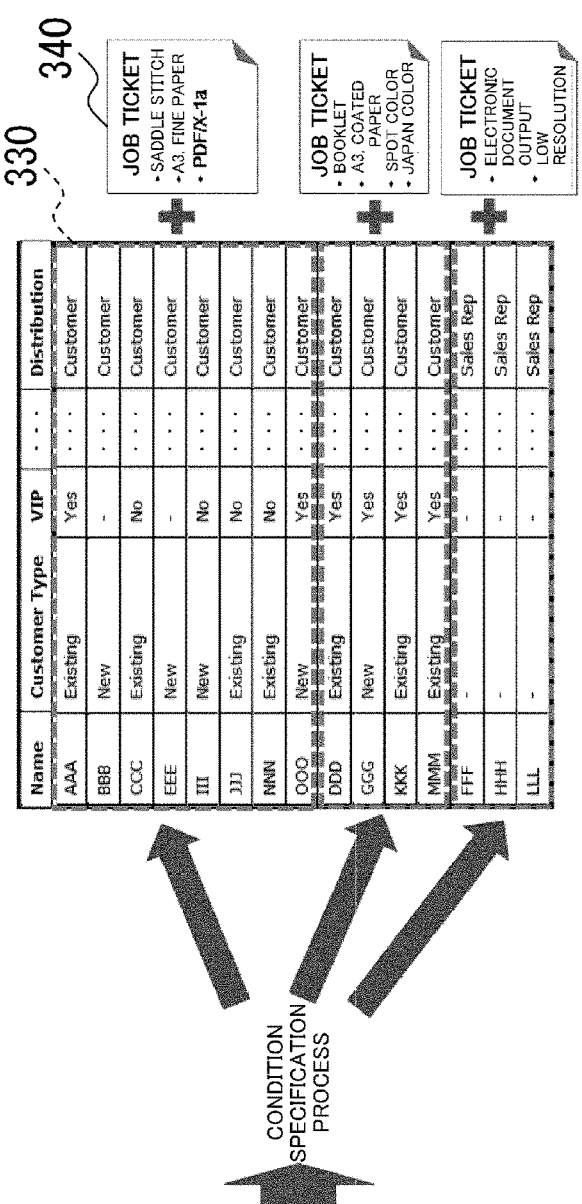
FIG. 6 is a conceptual diagram of subset integration in the variable data process as shown in FIG. 4.
Figure 7:
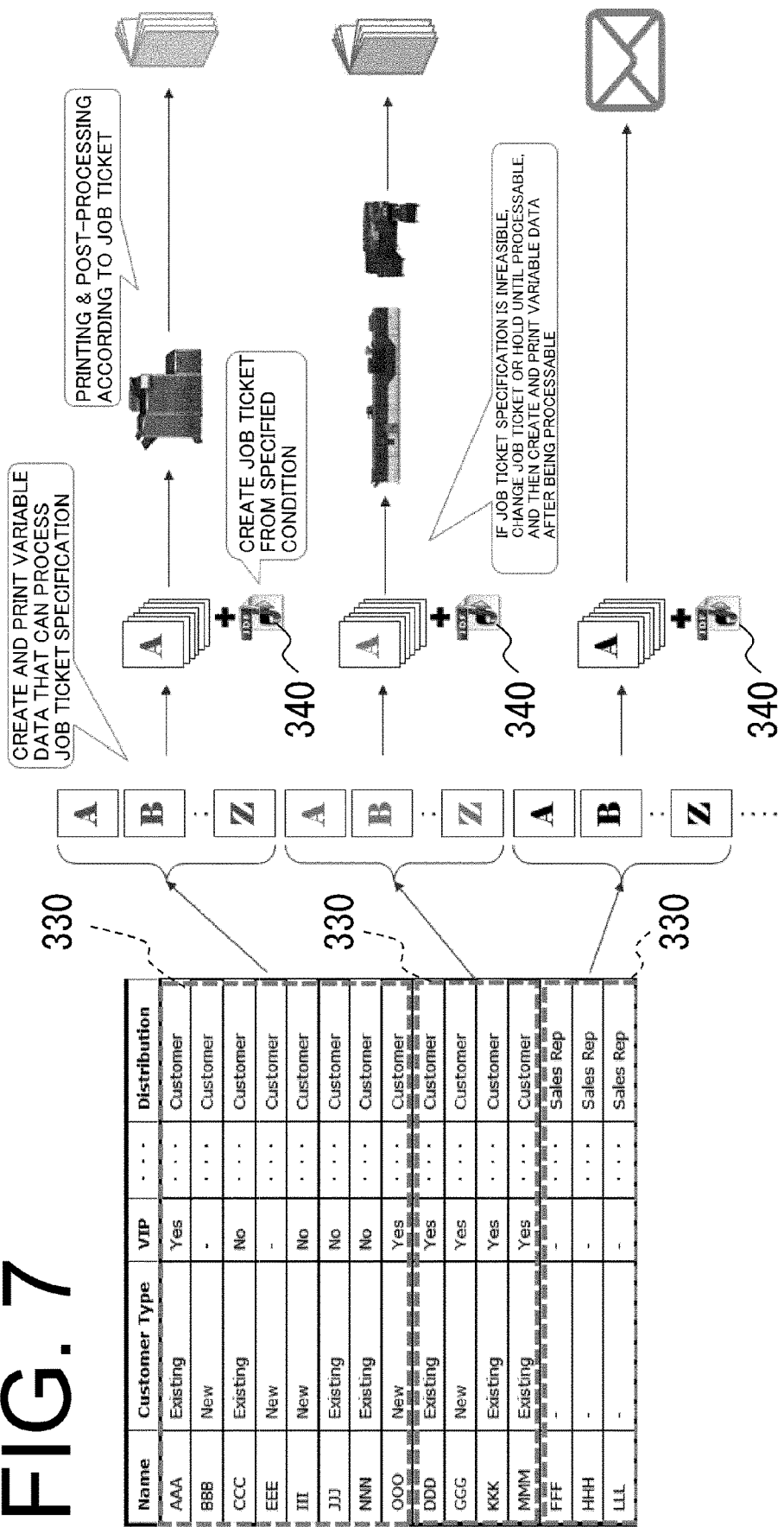
FIG. 7 is a conceptual diagram of creating a job ticket from a subset of the variable data process as shown in FIG. 4.
Figure 8:
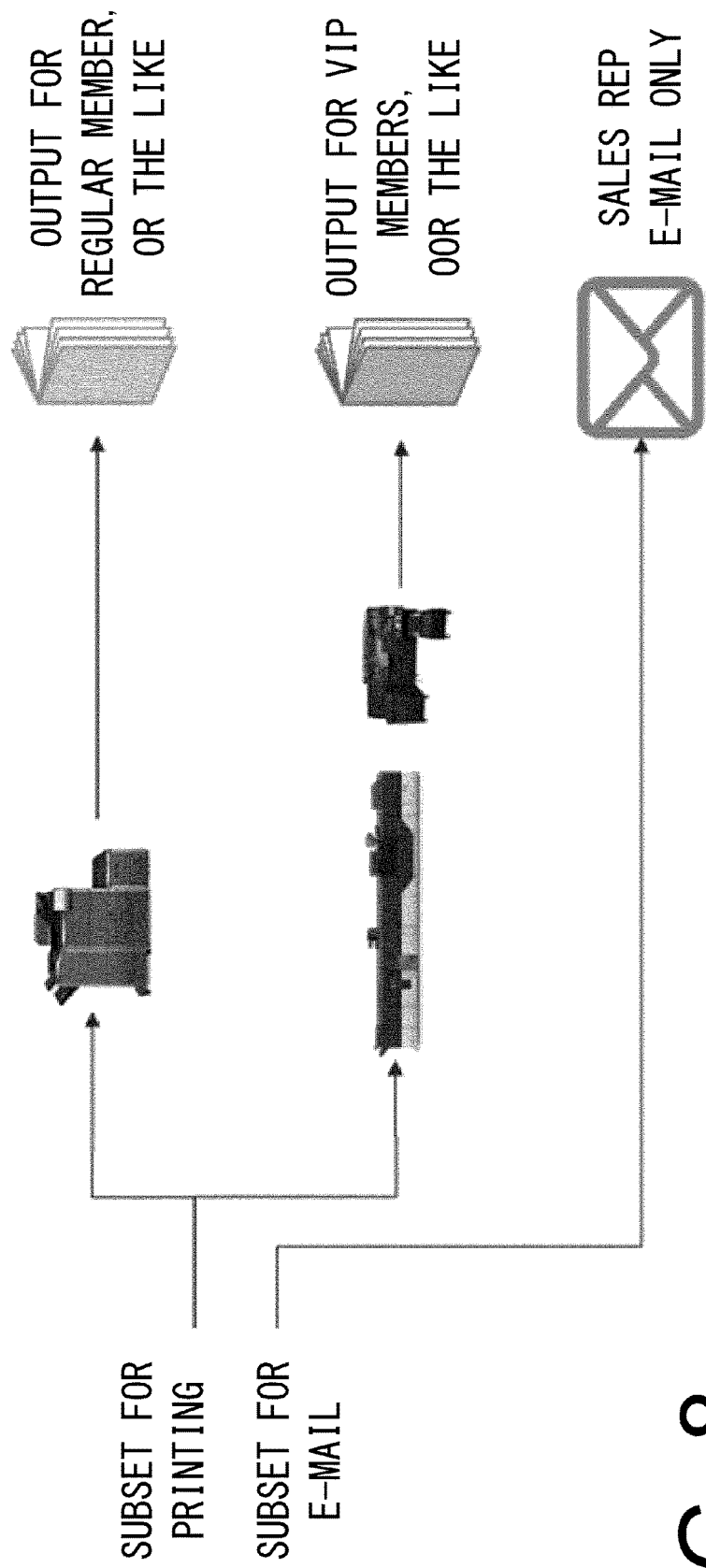
FIG. 8 is a conceptual diagram of job ticket process in the variable data process as shown in FIG. 4.

Next, with reference to FIGS. 6 to 8, variable data process by the production printing system X according to the embodiment of the present disclosure is described.

In the variable data process of the present embodiment, firstly, variable document data 300 in which conditions are set for each record is created. Then, the records where any one or any combination of prepress, printing, post-processing, and output destination is the same type is collected as the subset 330 according to the conditions set for each the record of the created variable document data 300. Then, the job ticket 340 corresponding to the collected subset 330 is created. After that, variable processing is performed by the created job ticket 340.

In the variable data process of the present embodiment, the control unit 10 of the server 1 mainly executes the control program stored in the storage unit 19 in cooperation with each unit and uses the hardware resources.

Figure 4:
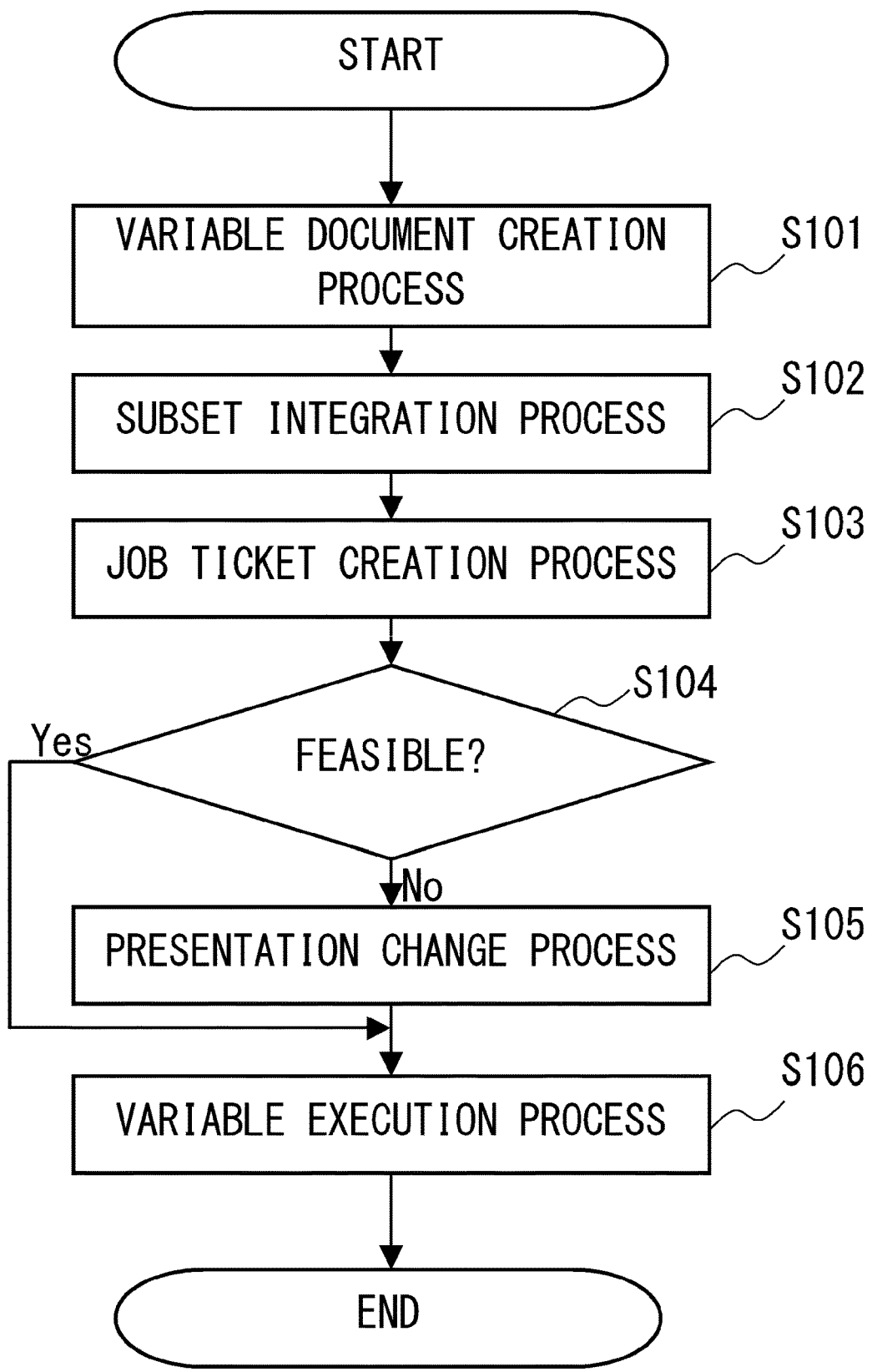
FIG. 4 is a flowchart of variable data process according to the embodiment of the present disclosure.

In the following, with reference to the flowchart of FIG. 4, the details of the processing by the server 1 is mainly described step by step.

(Step S101)

Firstly, the variable document creation unit 100 performs a variable document creation process.

The variable document creation unit 100 creates a variable document in which condition is set for each record.

Specifically, the variable document creation unit 100 creates a variable document by using a template included in the workflow data 350.

At this time, the variable document creation unit 100 can first set the output attribute of the record as a condition.

Further, the variable document creation unit 100 can perform a condition specification for specifying a condition for each record of the variable data 320 included in the variable document data 300. Specifically, in the present embodiment, the variable document creation unit 100 can set the prepress, printing, post-processing, and output destination by specifying the condition for each record. This makes it possible to create a wide variety of variable documents.

More specifically, the variable document creation unit 100 can specify the condition for the prepress process on the condition of the value of each record. In this case, it is possible to specify condition for prepress settings such as imposition, document size, scaling, or the like.

Alternatively, the variable document creation unit 100 can also specify the condition of the selecting page. For example, when finishing as a simplified version, it is possible to select only a specific page, and in the case of a full version, it is possible to specify all pages.

Further, the variable document creation unit 100 can also specify the condition for data conversion. For example, in the case of print output, it is possible to specify conversion to PDF/X, in the case of e-mail output, it is possible to specify conversion to low-resolution simple PDF, and the like.

Furthermore, the variable document creation unit 100 can also select a preset-defined prepress setting from the template.

In addition, the variable document creation unit 100 can specify the imposition, which is different for each record, as a condition by the value of each record. For example, it is possible to add text, images, barcodes, or the like, as the variable content to the pamphlet manuscript to perform personalized imposition.

Further, the variable document creation unit 100 can specify print attributes such as color designation such as paper and ICC profile as a condition by the value of each record.

In addition, as regarding the specification of post-processing, the variable document creation unit 100 can specify post-processing such as finishing as a condition by the value of each record.

Figure 5:
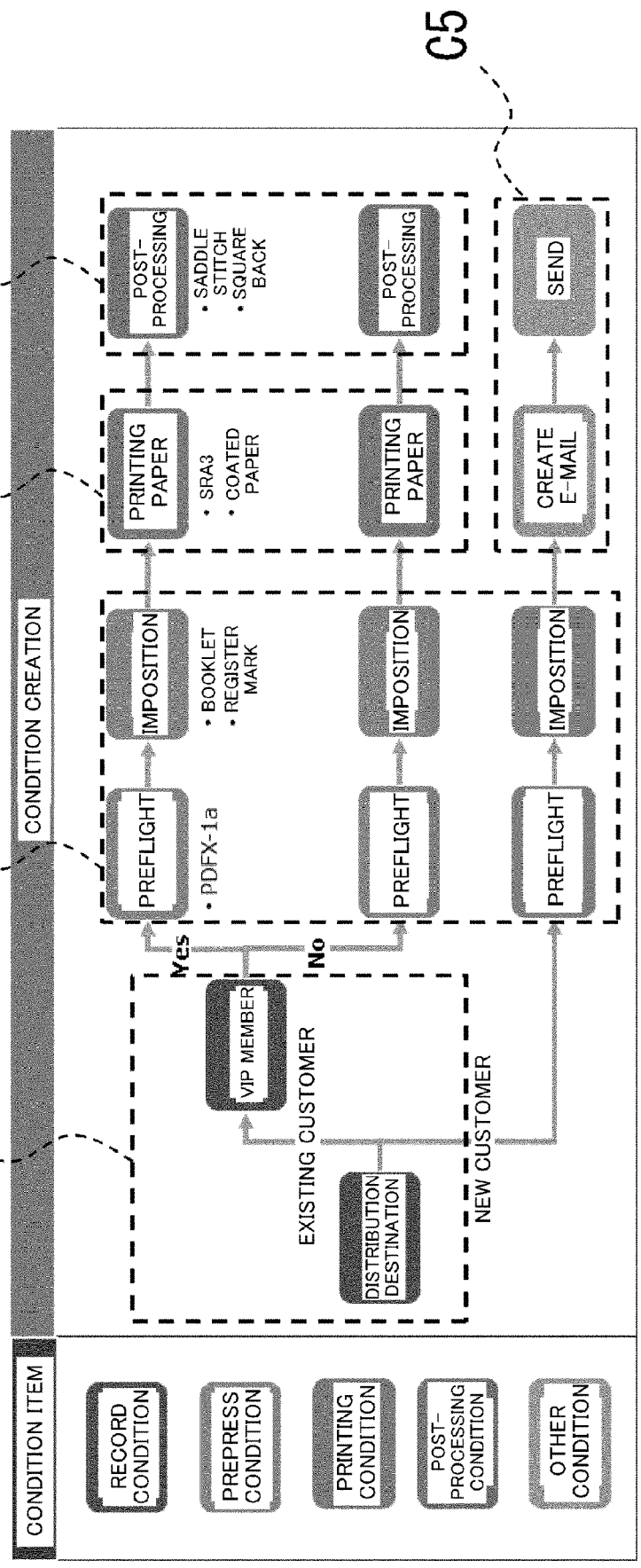
FIG. 5 is an example of a template in the variable data process as shown in FIG. 4.

With reference to the screen example 500 of FIG. 5, a specific example of actually specifying a condition by using a template in the GUI when creating this variable document is described.

In the present embodiment, it is possible to select a template and specify each condition item for each record of variable data 320 with a GUI such as the screen example 500.

Specifically, as shown in C1 of the screen example 500, as the output attribute of the record, the attribute corresponding to the type of each record can be specified as the "record condition". In this example, "new customer" or "existing customer" is specified as the output attribute. In addition, as an output attribute subordinate to the "existing customer", the condition of "VIP member" among the existing customers is specified.

Then, for each "record condition", the "prepress condition" as shown in C2 is specified. In this example, in the case of a condition of "VIP member" among the "existing customer", for example, using the format of "PCFX-1a" for "Preflight", booklet imposition (Booklet) for the "imposition", and adding the register mark are specified.

On the other hand, in the case of a condition that even an "existing customer" is not a "VIP member" (hereinafter referred to as "regular member"), by using the normal PDF format for "Preflight", a booklet imposition for "imposition", and adding the register mark, the simple printing is specified Furthermore, in the case of a condition of not being an existing customer, using a low-resolution converted image data format such as simple PDF, jpg, or the like, for "Preflight", imposition for each page for "imposition", and not adding register mark are specified.

Further, as the "printing condition" as shown in C3, as for the condition of "VIP member" of "existing customer", the size of "printing paper" is set to SRA3, and coated paper is specified.

On the other hand, regarding the condition of "regular member" in "existing customer", it is specified that plain paper is used while the size of "printing paper" remains SRA3.

Further, as the "post-processing condition" as shown in C4, as for the condition of "VIP member" of the "existing customer", the "post-processing" is closed in the middle and the corner spine finish is specified.

On the other hand, regarding the condition of "regular member" in "existing customer", "post-processing" is specified as only middle closing.

As described above, as a condition specification, regarding the condition of a record where the distribution destination is the existing customer, although it is a print output, to make a difference in printing and post-processing between "VIP member" and "normal member" can be done.

Then, the record of the new customer to be distributed is output as a digital document by e-mail.

In such a case, "Create E-mail" and "Send" are specified as in "Other condition" as shown in C5.

As in these examples, by specifying the condition by using the template, the prepress, printing, post-processing, and output destination can be set.

In addition, as a condition setting by using the above template, it is also possible to simplify the prepress specification by defining a plurality of prepress settings as a preset. For example, it is possible to prepare the prepress setting targeting for creating applications such as prepress settings for direct mail, or the like. Further, it is possible to the prepare setting for a specific customer such as "product pamphlet for Mr. XX", or the like.

Furthermore, the variable document creation unit 100 makes it possible to use the setting in common for specifying the other condition by using the template. That is, it can be used in the similar way as the "class" of an object-oriented language.

The template can also be shared. That is, it may be possible to centrally manage setting management such as changes, or the like. This may be done in the same way as using an instance of an object-oriented language "class" globally.

In addition, the variable document creation unit 100 can also create the template itself by using the GUI.

Further, the variable document creation unit 100 can directly specify by JDF and/or JMF, that is, programmatic description by using a so-called "macro" language, or the like, in addition to setting condition by using GUI.

(Step S102)

Next, the subset integration unit 110 performs the subset integration process.

The subset integration unit 110 collects the records of the variable data 320 of the variable document data 300 as the subset 330 according to the conditions set for each record of the variable document data 300 created by the variable document creation unit 100.

In this process, the subset integration unit 110 performs a process of collecting each record of the variable data 320. Here, the subset integration unit 110 can be collected the records by a plurality of measures according to the above-mentioned instructions in the GUI.

Specifically, in the present embodiment, the subset integration unit 110 can collect the records of the variable data 320 into the subset 330 according to the set condition specification. Specifically, the above-mentioned "VIP member" and "regular member" can be collected into the different subsets 330, respectively.

Further, the subset integration unit 110 can collect records of the same processing.

Therefore, the subset integration unit 110 temporarily creates a job ticket 340 according to the condition set in the above-mentioned variable document creation process for each record of the variable data 320 of the variable document data 300.

The subset integration unit 110 may collect the records having the same created job ticket 340 as the same processing. In this case, the subset integration unit 110 may determine that the processing is the same, for example, in the case that any one or any combination of prepress, printing, post-processing, and output destination is the same type.

Alternatively, the subset integration unit 110 may collect these records even if the processes are not exactly the same. Specifically, the subset integration unit 110 may determine that the records are similar if the processes are close to each other within a specific range. Here, when the prepress processing is partially different, the printing apparatus of the printing destination is different, or the type or processing of the post-processing is partially different, it may be within the specific range.

Contrary, the subset integration unit 110 may not be within the specific range when the output is different, such as when the output destination is different between the print output the e-mail output, or the like.

In addition, the settings in the specific ranges may be changed by the user.

On the other hand, the subset integration unit 110 can collect records with a specific attribute.

Specifically, the subset integration unit 110 can extract and collect records including the specific attribute from each record according to the condition. For example, the subset integration unit 110 can generate a subset 330 that is a collection of records having the same zip code. Further, the subset integration unit 110 can also perform name identification processing, or the like, on the subset 330, which is the collection of records having the same zip code. As a result, postage can be reduced.

Further, the subset integration unit 110 can also process in units of the collected subset 330. For example, the subset integration unit 110 may extract records of a specific subset 330 with different settings and collect them into another subset 330.

Further, the subset integration unit 110 can combine the collections according to the specified conditions. For example, the subset integration unit 110 may create another subset 330 by separately collecting the records of the subset 330 integrated by a specific attribute according to the condition specification. Further, the subset integration unit 110 may create another subset 330 by separately collecting the records of the subset 330 grouped by the condition specification with a specific attribute.

The condition specification for collecting these may be set by the user with the GUI of the application executed by the variable document creation unit 100 as described above.

That is, the variable document creation unit 100 may specify the other condition, which is different condition from it is set for each record. On this basis, the subset integration unit 110 may collect the records into the subset 300 by specifying the other condition.

In addition, the subset integration unit 110 can also specify conditions for nesting. That is, the subset integration unit 110 can also collects the records to the subset 330 by specifying condition such that a plurality of records are related.

Furthermore, the subset integration unit 110 can also specify a condition corresponding to "For statement" or "While statement" in various macros and high-level languages to collects records into the subset 330. As the condition specification at this time, a variable, a constant, a random number, or the like, can also be used.

For example, the subset integration unit 110 can set a condition such as the first 100 people, the "hit" of the lottery by the random number, or the like.

Further, the subset integration unit 110 can perform record operations such as copying or deleting a record collected in the subset 330, and it can change, add, or the like, for a specific item in the record.

With reference to FIG. 6, a specific example of the subset integration process is described.

In this example, the subset integration unit 110 is not simply integrated into the subset 330 by specifying a condition, but it performs the above-mentioned combination.

Specifically, the subset integration unit 110 collects each record of the variable data 320 into a subset 330 according to whether it is a "Customer" or a "Sales Rep" with the "Distribution" item as a condition specification. Further, the subset integration unit 110 may collect records of the same processing for the "Customer". For example, the subset integration unit 110 determines whether or not the record is processed such that printing is "coated paper" and post-processing is "saddle stitch" and "square spine back", such as for "VIP member". Then, the subset integration unit 110 collects these records into the subset 330. However, the subset integration unit 110 may exclude records that are "VIP members" but having the other exclusion factors, and the excluded records may be collected into the subset 330 of "regular members". As the other exclusion factor, for example, a condition such as being a "VIP member" who has been found to dislike luxurious printed matter by a questionnaire, or the like, may be set.

That is, in this example, the subset integration unit 110 collects the variable data 320 of the variable document data 300 into three subsets 330 of "normal member", "VIP member", and "Sales Rep" by these determination, respectively.

(Step S103)

Then, the job ticket creation unit 120 performs a job ticket creation process.

In the present embodiment, the job ticket creation unit 120 creates the job ticket 340 corresponding to the subset 330.

For example, the job ticket creation unit 120 generates a job ticket 340 for which prepress, printing, post-processing, and output destination are specified according to the attributes of the record for each subset 330.

Specifically, the job ticket creation unit 120 may select one of the above-mentioned temporarily created job tickets for the record included in the subset 330 and use this as the job ticket 340 of the subset 330 itself.

Alternatively, the job ticket creation unit 120 may create a job ticket 340 for the subset 330 separately from the temporarily created job ticket. In this case, the job ticket creation unit 120 may select which of the processes within the specific range specified by each of the records in the subset 330 is to be performed. This selection can be made, for example, based on what is specified in the most records, the average value, or the like.

In this way, the job ticket 340 for each subset 330 can be set, and there can be no need to create a job ticket 340 for each record.

With reference to FIG. 7, a specific example of creating the job ticket 340 is described.

In the present embodiment, the job ticket creation unit 120 creates a job ticket 340 that collectively changes the settings for each subset 330.

In the example of FIG. 7, the job ticket creation unit 120 creates job tickets 340 for the "VIP member" and "normal member" subset 330 as the "printing subset", respectively.

Further, the job ticket creation unit 120 creates a job ticket 340 for the subset 330 of the "Sales Rep" as the "e-mail subset 330".

More specifically, the job ticket creation unit 110 can create a job ticket 340 with print attribute specification based on the condition specification.

That is, as shown in follows, the print attribute is specified on condition that the value included in the record of the variable data 320 is used.

The following is an example of the description of JDF and/or JMF of the job ticket 340 for which the print attribute is specified:

If (Distribution=="Customer" && Customer Type=="Existing" && VIPMember=="Yes") {
 Media Type=Coated Paper
 Finishing=Booklet
 . . .
}

In addition, the job ticket creation unit 110 can also create a job ticket 340 in which print output, e-mail output, electronic document output, or the like, is specified based on the condition specification.

The following is an example of the description of the JDF and/or JMF of the job ticket 340 for which e-mail transmission is specified:

If (Distribution=="Customer" && Customer Type=="New") {
 Delivery=Email
 . . .
}

In this way, the job ticket creation unit 120 creates a job ticket 340 for each subset 330 to perform printing, post-processing, e-mail transmission, and simple printing.

(Step S104)

Here, the subset integration unit 110 determines whether the job ticket 340 corresponding to the subset 330 is feasible or not. That is, the subset integration unit 110 sets each subset 330 as one group and checks whether the processing of the job ticket 340 created for this subset 330 can be executed or not.

The subset integration unit 110 checks, for example, that the designated paper is set in the printing apparatus of the component apparatus 2, that the finisher of the designated post-processing process is not offline, and the like, via the network 5. Alternatively, the subset integration unit 110 may confirm with the user by GUI or perform this check from the value by set the user.

In addition, the subset integration unit 110 may perform this check for all the processing included in the job ticket 340.

As a result of this check, the subset integration unit 110 determines Yes if all the processing of the job ticket 340 of the subset 330 can be executed. Other than that, the subset integration unit 110 determines No if even one of the processing of the job ticket 340 of the subset 330 cannot be executed.

In the case of Yes, the subset integration unit 110 advances the process to step S106.

In the case of No, the subset integration unit 110 advances the process to step S105.

(Step S105)

If the processing of the job ticket 340 of the subset 330 cannot be executed, the subset integration unit 110 and the variable document creation unit 100 perform the presentation change process.

The subset integration unit 110 detects an infeasible attribute value from the records included in the subset 330 corresponding to the job ticket 340 that cannot perform processing. The subset integration unit 110 sends this attribute value to the variable document creation unit 100 as data.

The variable document creation unit 100 that has acquired this data can present it to the user by GUI. For example, the variable document creation unit 100 can acquire a user's instruction and edit an infeasible attribute value. In this case, the variable document creation unit 100 can change the record of the variable data 320 of the variable document data 300. As a result, the variable document creation unit 100 can change the variable document data 300 according to the check.

Further, the subset integration unit 110 can also change the job ticket 340 itself, which cannot be processed. That is, to change the processing in units of the subset 330 is possible.

In addition, the subset integration unit 110 does not have to use the job ticket 340 in units of the subset 330. In this case, for example, the subset integration unit 110 determines whether or not the job ticket temporarily created for each of the above-mentioned records is feasible, and it collects only the feasible records. That is, the subset integration unit 110 may extract the records that can be processed in the subset 330 and collects them as a new subset 330.

Alternatively, the subset integration unit 110 may extract records to be processed by the printing apparatus or the post-processing apparatus of the different component apparatus 2 within the subset 330 and collects them as a new subset 330.

Further, the subset integration unit 110 may extract only the records that can be processed by the capacity of the component apparatus 2 in the subset 330 and collects them as a new subset 330.

(Step S106)

Here, the variable processing unit 130 performs the variable execution process.

The variable processing unit 130 performs processing to execute a job on each component apparatus 2 by the job ticket 340 created by the job ticket creation unit 120.

In the present embodiment, the variable processing unit 130 processes each record of the created job ticket 340 for each subset 330. Here, in the above-mentioned presentation change process, only the process for the subset 330 in which the job ticket 340 that can be executed is created or extracted may be executed.

Specifically, the variable processing unit 130 changes the settings of any one or any combination of imposition, document size, scaling, selection page, and data conversion in the prepress according to the job ticket 340. In this case, the variable processing unit 130 causes the prepress apparatus of the component apparatus 2 to perform these prepress processes.

Further, the variable processing unit 130 sets the output destination to any one or any combination of print output, e-mail output, and electronic document output according to the job ticket 340, and it performs processing. In the case of print output, the variable processing unit 130 causes the component apparatus 2 to perform processing by a printing apparatus, a post-processing apparatus, a shipping management server, or the like, for the production printing.

With reference to FIG. 8, a specific example of the processing is described.

The variable processing unit 130 performs "normal member output" processing for simple printing by using the job ticket 340 of the subset 330 for "normal member" of the "printing subset" as shown in FIGS. 6 and 7 as described above. On the other hand, the variable processing unit 130 performs "VIP member output" processing for post-printing processing by using the job ticket 340 of subset 330 for the "VIP member" of the "printing subset".

Further, the variable processing unit 130 processes only the simple PDF or jpg e-mail transmission and electronic document output by the job ticket 340 of the subset 330 for "Sales Rep" of the "e-mail subset". In this case, the variable processing unit 130 may send an e-mail or an electronic document to the e-mail address described in the item of each record of the subset 330. Alternatively, the variable processing unit 130 may cause the shipping management server of the component apparatus 2 to send an e-mail and manage the e-mail together with the printed output.

This completes the variable data process according to the embodiment of the present disclosure.

As configured in this way, the following effects can be obtained.

In typical variable printing, pages that is set the same finishing in each record are grouped together as a subset on the same printer. Then, when a print error occurs, the range in which the print process is suspended is changed depending on whether it is the first page in the record or the first page in the subset.

However, in actual production printing, different processes are set by specifying various conditions, so that it is not possible to efficiently process a job by dividing a record into a subset by the typical technology.

On the other hand, the production printing system X according to the embodiment of the present disclosure is a production printing system that processes variable data for production printing, including: a variable document creation unit 100 that creates a variable document data 300 with a condition set for each record; a subset integration unit 110 that collects records as a subset 330 according to the condition set for each record of the variable document data 300 created by the variable document creation unit 100; a job ticket creation unit 120 that creates a job ticket 340 corresponding to the subset 330 collected by the subset integration unit 110; and a variable processing unit 130 that performs processing by the job ticket 340 created by the job ticket creation unit 120.

With this configuration, even if the variable document is set different processing in various condition specifications, the subset 330 in which the records are collected according to the set condition specification can be created. Thus, a job ticket 340 can be set for each of the subset 330 by collecting records.

As a result, the variable document data 300 can be divided into subsets 330, job tickets 340 can be created for each subset 330, and job tickets for each record can be unnecessary. Therefore, the job can be processed, efficiently. That is, one variable data 320 can be divided into a plurality of subsets 330, each subset 330 can be treated as like one job, and more efficient and flexible processing can be performed.

Therefore, the efficiency of the work of putting together the same type can be improved, and the cost of processing and transportation can also be reduced.

Therefore, the efficiency of variable printing in an actual production printing system can be improved, and it has been expanded to "one-source multi-use" use. For example, various types of documents, data for e-mail, and the like, can be created from one manuscript PDF with one variable document data 300. That is, even in this case, since the job ticket 340 in units of the subset 330 may be prepared, the processing efficiency is improved.

Further, in the production printing system X according to the embodiment of the present disclosure, the subset integration unit 110 collects the records of the same processing.

With this configuration, even if it is difficult to distinguish the same type of record due to different processing being set by specifying conditions for each record, or the like, it can be handled. Specifically, records having the same print attributes and output processing can be grouped into a subset 330 as records of the same processing. Therefore, more efficient variable printing becomes possible.

Further, by creating a common job ticket 340 for the subset 330 within the specific range that is not necessarily the same, the processing can be unified, and similar output can be performed, collectively.

Further, in the production printing system X according to the embodiment of the present disclosure, the subset integration unit 110 the collects the records with the specific attribute.

With this configuration, it is possible to perform further processing such as name identification processing, or the like, for the subset 330 in which records having the same zip code are collected.

Further, in the production printing system X according to the embodiment of the present disclosure, the subset integration unit 110 collects the records into the subset 330 according to the set condition specification.

With this configuration, the subset 330 can be collected to create a job ticket 340 and perform processing according to the condition specification intended by the user.

Further, in this condition specification, a condition in which a plurality of records is related can be specified, in addition to the simple determination condition. For example, it is possible to process an appropriate variable document by specifying complicated conditions, which involves multiple records.

Therefore, the variable data 320 can be created more flexibly by specifying the condition.

Furthermore, in order to print a variable document and create a printed matter, not only the design of the variable document but also the processing according to the specification of the prepress processing including imposition, document size, scaling, selection page, data conversion, or the like, can be performed, efficiently. This makes it possible to process a wider variety of variable documents, and to output a wide range of prepresses that match actual work. Further, at the time of prepress, image conversion for electronic data output can be efficiently performed.

Further, in the production printing system X according to the embodiment of the present disclosure, the subset integration unit 110 checks whether the job ticket 340 corresponding to the subset 330 can be executed, and the variable document creation unit 100 change variable document data 300 according to the check.

With this configuration, it is possible to perform the processing except for the subset 330 that cannot be executed. Therefore, the user's trouble can be reduced.

Other Embodiments

In the above-described embodiment, an example is described where the subset 330 is data that includes the form data 310.

However, the subset 330 may be data in the same format as the variable data 320. Alternatively, the subset 330 may be database-like data that is different from the variable data 320. In these cases, data to refer (link) the original variable document data 300 may be included in the subset 330. Further, the subset 330 may use data such as PDF corresponding to each job ticket 340.

With this configuration, various configurations can be supported. Also, the amount of data can be reduced by limiting the subset 330 to only the data similar to the variable data 320.

Further, in the above-described embodiment, an example is described in which a temporary job ticket is created for each record of the variable document data 300 and then collected.

However, the variable data 320 may be collected into the subset 330 simply by specifying conditions, and then the job ticket 340 of the subset 330 may be created.

Further, it may be determined whether or not to create a temporary job ticket for the record by any one of a plurality of measures of collecting.

With this configuration, it is not necessary to create a temporary job ticket for each record. Further, the processing load for creating can be reduced.

Furthermore, in the above-described embodiment, an example is described where a job ticket 340 described in JDF and/or JMF is created and each process of the variable document is performed.

However, it may be configured so as not to create JDF and/or JMF. In this case, each apparatus may be directly controlled according to the conditions set in each variable data 320. Further, this control may be performed in the same manner as the job ticket 340.

Also, a job ticket 340 for other processes may be created, such as changing the process for performing inspection after output, or the like.

By configuring in this way, various configurations can be supported.

In addition, in the above-described embodiment, an example of changing the prepress, printing, post-processing, output destination, or the like, with the job ticket 340 according to the condition set in the record has been described.

However, these changes may be made under other condition such as the number of records of the same type, the file type of the record, or the like. Further, when there is a plurality of component apparatuses 2 at the output destination, the apparatuses may be selected by prioritizing them according to the condition. For example, as a process of "record condition", in the case of "VIP member", a printing apparatus having a high resolution, or a large number of inks may be specified. Otherwise, in the case of a "normal member", a printing apparatus having a low printing cost and a normal finish or a digital printing apparatus may be specified.

Further, when the number of records is small or when printing is performed in a small lot, a condition for performing printing only by a digital printing apparatus without using an offset printing apparatus can be specified. Alternatively, although offset printing is not used at the time of prepress, offset printing and digital printing may be used properly at the time of actual printing.

With this configuration, various condition can be set to perform variable printing that is actually required in a production printing system.

Further, in the above-described embodiment, an example in which a set template is used for condition specification is described.

However, the template may be changed depending on the processing result after output. For example, if there are many "VIP members" who wish to send an e-mail according to the results of the questionnaire, the change may be made automatically, such as sending an e-mail at the same time as outputting the printed matter.

Further, the form data 310 and the variable data 320 of the variable document data 300 may also be automatically changed depending on the processing result after the output.

Also, similarly, the subset 330 can also be changed depending on the processing result after output, or the like. In this case, only the item may be changed, or the measure of collecting the subset 330 itself may be changed.

With this configuration, variable printing can be performed in a production printing system that is more suitable for the actual situation.

In the above-described embodiment, an example of automatically generating a job ticket 340 by the job ticket creation unit 110 has been described.

However, it may be possible for the user to directly create the job ticket 340 according to the setting of the condition by the variable document creation unit 100.

Further, in the above-described embodiment, an example in which the job ticket 340 is attribute data of processing such as JDF and/or JMF is described. However, the job ticket 340 may also be capable of using data in a format such as a macro language or a programming language.

Further, in the above-described embodiment, as the production printing, an example of variable printing on a printed matter of paper, sending an e-mail, and outputting an electronic document has been described, but the present disclosure can also be applied to other production printing. For example, it is also applicable to variable book printing, on-demand printing, and other printing.

Alternatively, it can be used, for example, for split printing of large-format posters, sheet printing for exteriors and interiors of aircraft and automobiles, manufacturing of electronic components such as flat displays and electronic substrates, printing of cultured cells, and the like. In this case, as the component apparatus 2, an industrial inkjet printer, an industrial robot, various reaction apparatuses, a culturing apparatus, and the like, can also be used.

With this configuration, it can be used for various purposes.

Further, in the above-described embodiment, an example in which various processes are performed on the server 1 has been described.

However, it may be configured by using a dedicated terminal for creating variable data 320, by using another server for managing workflows, by performing prepress processing via the administrator terminal 3, by using an e-mail sending server, by using another apparatus for creating and controlling the job ticket 340, or the like.

Further, it is needless to say that the configuration and operation of the above-described embodiment are examples and can be appropriately modified and executed without departing from the aim of the present disclosure.

What is claimed is:

1. A production printing system that processes variable data for production printing, comprising:
    a variable document creation unit configured to create a variable document with a condition set for each record;
    a subset integration unit configured to collect records as a subset according to the condition set for each the record of the variable document created by the variable document creation unit;
    a job ticket creation unit configured to create a job ticket corresponding to the subset collected by the subset integration unit; and
    a variable processing unit configured to perform processing by the job ticket created by the job ticket creation unit, wherein
    as a condition of the condition set, output attribute, prepress, printing, post-processing, or output destination is set for the each record.

2. The production printing system according to claim 1, wherein
    the subset integration unit
    collects the records of same processing wherein
    the same processing is in a case that any one or any combination of prepress, printing, post-processing, and output destination is the same type.

3. The production printing system according to claim 1, wherein
    the subset integration unit
    collects the records with a specific attribute; and
    creates another subset by separately collecting records of the subset integrated by the specific attribute according to the condition specification, or
    creates another subset by separately collecting records of the subset integrated by the condition specification with the specific attribute.

4. The production printing system according to claim 1, wherein
    the subset integration unit
    collects the records into the subset according to set condition specification.

5. The production printing system according to claim 1, wherein
    the subset integration unit checks whether the job ticket corresponding to the subset can be executed, and
    the variable document creation unit changes the variable document according to the check.

6. A server for production printing systems that process variable data for production printing, comprising:
    a variable document creation unit configured to create a variable document with a condition set for each record;
    a subset integration unit configured to collect records as a subset according to the condition set for each the record of the variable document created by the variable document creation unit;
    a job ticket creation unit configured to create a job ticket corresponding to the subset collected by the subset integration unit; and
    a variable processing unit that performs processing by the job ticket created by the job ticket creation unit, wherein
    as a condition of the condition set, output attribute, prepress, printing, post-processing, or output destination is set for the each record.

7. The server according to claim 6, wherein
    the subset integration unit
    collects the records of same processing wherein
    the same processing is in a case that any one or any combination of prepress, printing, post-processing, and output destination is the same type.

8. The server according to claim 6, wherein
    the subset integration unit
    collects the records with a specific attribute and
    creates another subset by separately collecting records of the subset integrated by the specific attribute according to a condition specification, or
    creates another subset by separately collecting records of the subset integrated by the condition specification with the specific attribute.

9. The server according to claim 6, wherein
    the subset integration unit
    collects the records into the subset according to set condition specification.

10. The server according to claim 6, wherein
    the subset integration unit checks whether the job ticket corresponding to the subset can be executed, and
    the variable document creation unit changes the variable document according to the check.

11. A variable printing method executed by a server of a production printing system that processes variable data for production printing, comprising the steps of:
    creating a variable document with a condition set for each record;
    collecting records as a subset according to the condition set for each the record of the variable document that is created;
    creating a job ticket corresponding to the subset that is collected; and
    performing processing by the job ticket that is created;
    wherein
    as a condition of the condition set, output attribute, prepress, printing, post-processing, or output destination is set for the each record.

12. The variable printing method according to claim 11, wherein
    the step of collecting records comprises collecting the records of same processing, wherein
    the same processing is in a case that any one or any combination of prepress, printing, post-processing, and output destination is the same type.

13. The variable printing method according to claim 11, wherein the step of collecting records comprises collecting the records with a specific attribute; and the method further comprises creating another subset by separately collecting records of the subset integrated by the specific attribute according to a condition specification, or creating another subset by separately collecting records of the subset integrated by the condition specification with the specific attribute.

14. The variable printing method according to claim 11, wherein the step of collecting records comprises collecting the records into the subset according to set condition specification.

15. The variable printing method according to claim 11, comprising checking whether the job ticket corresponding to the subset can be executed; and changing the variable document according to the check.

16. The production printing system according to claim 1, wherein the output attribute of the record is an attribute according to the type of each record.

17. The production printing system according to claim 16, wherein the record type is a condition related to a new customer or an existing customer.

18. The production printing system according to claim 4, wherein the condition specification includes prepress setting condition specification, selection page condition specification, and data conversion specification.

* * * * *